Patented Aug. 10, 1948

2,446,980

UNITED STATES PATENT OFFICE 2,446,980

PROCESS FOR PREPARING GUANAMINES

Daniel Elmer Nagy, Stamford, Conn., assignor to American Cyanamid Company, New York, N. Y., a corporation of Maine No Drawing. Application August 30, 1941, Serial No. 409,151

7 Claims. (Cl. 260—249.5)

This invention relates to an improved method of preparing guanamines.

Most of the methods which have hitherto been used in preparing guanamines required as one of the reagents free biguanide or an N-substituted biguanide. This adds considerably to the cost of production because biguanide is prepared industrially in the form of its sulfate and a further step is required to isolate the free biguanide. A method whereby guanamines could be prepared in high yields directly from the more readily obtainable biguanide sulfate would thus be of considerable value.

While it has long been known (Rackmann, Annalen 376, 163 (1910)) that acid chlorides will react with biguanide salts in the presence of aqueous alkali to form guanamines, the yields by this method have never been increased beyond 10 to 15%.

It has now been found that if acid chlorides or anhydrides are combined with biguanide salts in the presence of concentrated aqueous alkali and an inert organic solvent such as acetone, dioxane, pyridine, benzene, and the like; and having present about an equal volume of the organic solvent for each volume of water present, and preferably two or more volumes of the organic solvent, as is convenient, then the yield of the guanamine becomes very high and may approach the theoretical. No theoretical explanation will be offered for this unexpected beneficial action of the added inert organic solvent since on the one hand it has been found that the use of hydroxyl containing organic solvents, such as methanol and ethanol, does not serve to increase the yields in a similar manner, as would be expected; and on the other hand, the substitution of an ester for the acid chloride or anhydride likewise gives only negligible yields in the presence of the added non-hydroxylic organic solvent, a fact likewise contrary to expectation.

The biguanide sulfate or the other salt is suspended in an organic solvent which should be one free from hydroxy groups such as for example, acetone, dioxane, pyridine, benzene, and the like, and concentrated aqueous inorganic alkali is added. The anhydride or acid chloride of an ordinary organic carboxylic acid corresponding to the guanamine which is to be prepared is then slowly introduced. The reaction in most cases proceeds best if cooled at least in its initial stages and the temperature not permitted to rise materially above room temperature.

The alkali used is not critical. Sodium hydroxide is preferred because of its cheapness, but of course, potassium hydroxide and other basic alkali hydroxides may be employed.

The guanamines which are most commonly used are those in which the two amino groups on the triazine ring are unsubstituted. These are prepared from biguanide sulfates and other biguanide salts. However, the invention is not limited to such guanamines and N-substituted guanamines can be prepared by the same method using the corresponding N-substituted biguanide salt.

A marked saving is obtained by the present invention which proceeds with very high yields because the biguanide salt is cheaper than the free biguanide and also in the case of certain guanamines, such as the carboxy guanamines the dibasic anhydride is actually the cheapest form of the acid. For example, when phthalic anhydride is used this is much cheaper than any ester of phthalic acid, and in the case of such materials additional savings of cost are effected.

A further advantage of the present invention lies in the fact that reaction proceeds with satisfactory speed and hence it is not necessary to employ an extremely long reaction time which is required with certain processes of making guanamines from some esters. A marked savings in the time equipment is in use is thus realized.

An additional advantage of the present invention is that the use of strongly basic condensing agents such as metal alkoxides is unnecessary and the relatively high cost of these materials is thus saved. When guanamines are prepared from the esters in many cases stoichiometrical proportions of metal alkoxide are required so that the cost of the metal alkoxide forms a considerable factor in the total cost of producing the guanamines.

The present invention will be described in greater detail in conjunction with the following specific examples which represent the production of typical guanamines by the process of the present invention. The examples are illustrative only and the invention is not limited to the exact details therein set forth. The parts are by weight.

EXAMPLE 1

ω-carboxypropionoguanamine

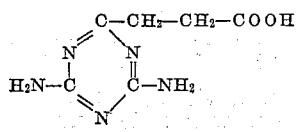

Forty-five parts of biguanide neutral sulfate were suspended in a mixture of 35 parts water and 150 parts dioxane, whereupon 111 parts of 36% sodium hydroxide were added and 27 parts of solid powdered succinic anhydride gradually introduced with stirring while maintaining the temperature below 20° C. After completion of the reaction the supernatant dioxane layer was removed and then the ω-carboxypropionoguanamine was precipitated from the aqueous layer by acidification to a pH of about 4. The yield was 62%. When no dioxane was used the yield was about 5%. When 150 parts of ethanol was substituted for the dioxane the yield likewise dropped to about 5%.

EXAMPLE 2

Orthocarboxy benzoguanamine

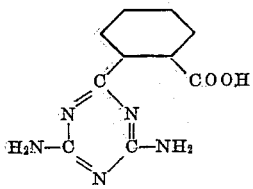

Forty-five parts of biguanide neutral sulfate were suspended in 50 parts water, and 111 parts of 36% sodium hydroxide solution added with cooling. Thereupon a solution of 44.4 parts of phthalic anhydride in about 130 parts of warm acetone was added to the stirred mixture, the temperature being permitted to rise to 30° C. for a short time. After the reaction was complete the upper liquid layer containing most of the acetone was separated, and the free o-carboxy benzoguanamine in 55% yield was precipitated from the aqueous layer as in Example 1.

When part of the acetone was replaced by benzene the yield of o-carboxy benzoguanamine was the same. In the absence of the organic solvent, the yield of the o-carboxy benzoguanamine was negligible.

EXAMPLE 3

Acetoguanamine

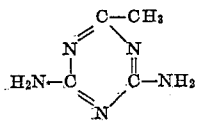

Forty-five parts of biguanide neutral sulfate were suspended in a mixture of 35 parts of water and 120 parts of acetone; 111 parts of 36% sodium hydroxide solution were added followed by the addition of 27.6 parts of acetic anhydride. The mixture was vigorously stirred, the temperature being maintained at 5–7° C. The acetoguanamine was readily recovered in 61% yield and in pure form by evaporating the acetone, cooling the aqueous slurry, and filtering the precipitated acetoguanamine.

EXAMPLE 4

Benzoguanamine

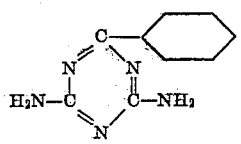

Forty-five parts of powdered biguanide neutral sulfate were suspended in about 150 parts of acetone. Seventy-eight parts of 36% sodium hydroxide solution were added and then 42.3 parts of benzoyl chloride were introduced with stirring, the temperature being maintained between 0–5° C. The benzoguanamine was recovered in 83% yield by working up the reaction mixture as in Example 3.

EXAMPLE 5

Myristoguanamine

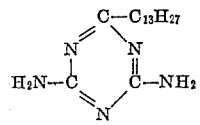

Forty-five parts of biguanide neutral sulfate were suspended in 140 parts of acetone, 78 parts of 36% sodium hydroxide solution were added and then 74.1 parts of myristoyl chloride were introduced slowly with stirring, the temperature being maintained between 0–5° C. The mixture became so thick that it was difficult to stir and additional acetone was added to maintain sufficient fluidity. A total of about 120 parts of acetone were added. After reaction was complete a yield of about 53.5% of the myristoguanamine was obtained.

I claim:

1. A method of producing a guanamine which comprises reacting a biguanide salt with a compound included in the group consisting of carboxylic acid anhydrides and carboxylic acid chlorides in the presence of aqueous caustic alkali and a large proportion of acetone.

2. A method of producing a guanamine which comprises reacting an unsubstituted biguanide salt with a compound included in the group consisting of carboxylic acid anhydrides and carboxylic acid chlorides in the presence of aqueous caustic alkali and a large proportion of acetone.

3. A method of producing a guanamine which comprises reacting a biguanide salt with a compound included in the group consisting of carboxylic acid anhydrides and carboxylic acid chlorides in the presence of aqueous caustic soda and a large proportion of acetone.

4. A method of producing a guanamine which comprises reacting an unsubstituted biguanide salt with a compound included in the group consisting of carboxylic acid anhydrides and carboxylic acid chlorides in the presence of aqueous caustic soda and acetone.

5. A method of preparing benzoguanamine which comprises reacting an unsubstituted biguanide salt suspended in acetone with benzoyl chloride in the presence of aqueous caustic alkali.

6. A method of preparing myristoguanamine which comprises reacting an unsubstituted biguanide salt in the presence of acetone with myristoyl chloride in the presence of aqueous caustic alkali.

7. A method of preparing ortho-carboxy benzoguanamine which comprises reacting an unsubstituted biguanide salt suspended in acetone with phthalic anhydride in the presence of aqueous alkali.

DANIEL ELMER NAGY.

REFERENCES CITED

The following references are of record in the file of this patent:

UNITED STATES PATENTS

| Number | Name | Date |
| --- | --- | --- |
| 2,136,502 | Hartman | Nov. 15, 1938 |

(Other references on following page)

FOREIGN PATENTS

| Number | Country | Date |
|--------|---------|------|
| 798,639 | France | 1935 |

OTHER REFERENCES

Liebigs Annalen de Chemie 376, pp. 167 and 180–181.

Monatschaft für Chemie 48, p. 147.

Fuson & Shriner, "Identification of Organic Compounds" (1940), pages 129 and 147, John Wiley & Sons.

McArdle, "Solvents in Synthetic Organic Chemistry" (1925), pp. 3, 101 and 129.